J. PORTEOUS.
VINEYARD AND ORCHARD TRUCK.
APPLICATION FILED FEB. 8, 1911.

995,716.

Patented June 20, 1911.

Witnesses:
Arthur L. Slee.
S. Constine.

Inventor:
James Porteous
by Wm. F. Booth
his Attorney

UNITED STATES PATENT OFFICE.

JAMES PORTEOUS, OF FRESNO, CALIFORNIA.

VINEYARD AND ORCHARD TRUCK.

995,716.    Specification of Letters Patent.    Patented June 20, 1911.

Application filed February 8, 1911. Serial No. 607,224.

*To all whom it may concern:*

Be it known that I, JAMES PORTEOUS, a citizen of the United States, residing at Fresno, in the county of Fresno and State of California, have invented certain new and useful Improvements in Vineyard and Orchard Trucks, of which the following is a specification.

My invention relates to that class of trucks which are especially adapted for use in vineyards and orchards, and which comprise a platform mounted upon axles having wheels with relatively wide treads, the connection of the platform and the axles being through bolsters and king-bolts, either axle serving for the attachment for the draft pole, according to the direction of travel. These trucks for the use intended, sometimes supplant and sometimes supplement wagons and are very popular with the vineyardist and orchardist.

My invention consists in the novel construction of the connection between the platform-frame and the axles, and its object is to simplify, strengthen and cheapen the truck.

Figure 1:
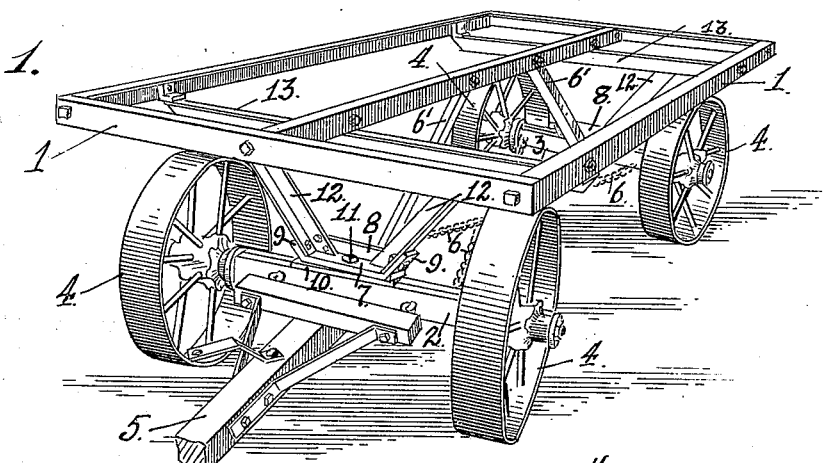
Figure 2:
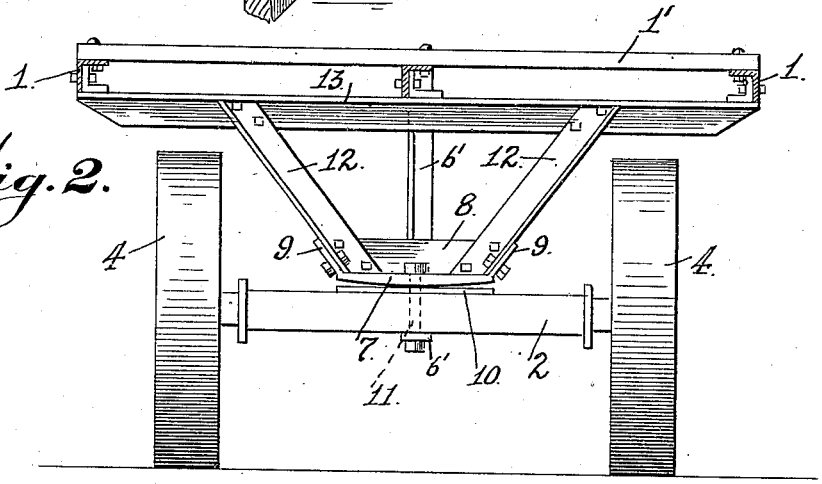
Figure 3:
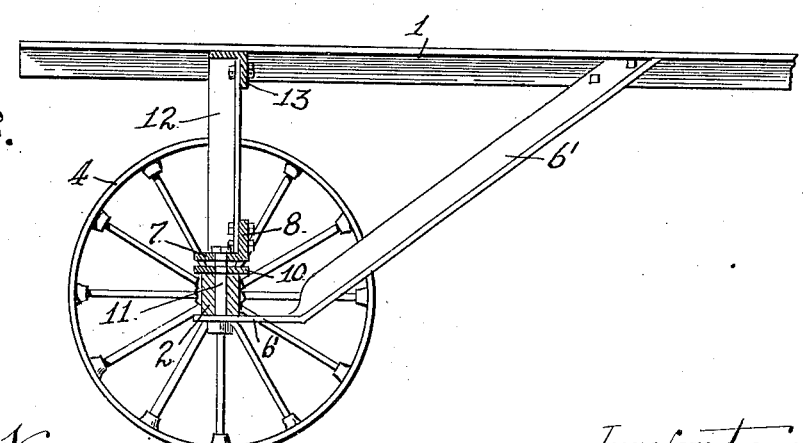

Referring to the accompanying drawings:—Figure 1 is a perspective view of my improved truck, the platform being removed from its frame. Fig. 2 is a front elevation of the truck. Fig. 3 is a central longitudinal section of one end of the truck.

1 is the platform-frame, upon which is bolted, as seen in Fig. 2, the platform 1'. 2 is one axle, 3 is the other axle, 4 are the wheels, 5 is the draft pole and 6 are the chains connecting the axles to make the wheels follow.

6' are braces extending from the central member of the platform frame to and under the axles.

Instead of the usual wooden head block and wooden bolster, I have the following construction. 7 is an iron casting formed with a base, a back flange 8, and outwardly sloping ends 9. The under surface of the base of the casting, as is seen in Fig. 2, is rounded longitudinally and is supported and rocks upon a plate 10. The casting is connected with the axle by a king bolt 11, which passes down through it and through the plate 10 and the axle and takes the forward end of the brace 6', as shown in Figs. 2 and 3. 12 are angle-steel members. These diverge upwardly, their lower ends being bolted within the angles of the casting 7 formed by its back flange and ends, and their upper ends being bolted to an angled cross member 13 of the platform-frame. As will be seen there is one of these angled structures at each end of the truck. This connection of the platform frame with the axles serves all the purposes of the ordinary head blocks and bolsters, but is lighter, stronger, more lasting, cheaper and simpler than the ordinary wooden structures, especially when the fact that the truck is a double ender and that therefore two must be provided is taken into consideration.

Having thus described my invention what I claim as new and desire to secure by Letters Patent is—

1. In a truck of the character described and in combination with its platform frame and wheeled axles, the connection between said frame and axles, consisting of a casting supported upon and pivotally connected with the axle, said casting being formed with a base, a back flange and outwardly sloping ends, and upwardly diverging angle-members, secured at their lower ends to the casting in the angles formed by the back flange and ends of said casting, and secured at their upper ends to the platform frame.

2. In a truck of the character described and in combination with its platform frame and wheeled axles, the connection between said frame and axles consisting of a casting formed with a base having a longitudinally rounded under surface, a back flange and outwardly sloping ends, a plate on the axle upon which said casting is supported and rocks, a pivot bolt passing down through the casting, the plate and the axle, and upwardly diverging angle-members, secured at their lower ends to the casting in the angles formed by the back flange and ends of said casting, and secured at their upper ends to the platform frame.

3. In a truck of the character described, and in combination with its platform frame and wheeled axles, the connection between said frame and axles consisting of a casting formed with a base adapted to rest upon the axle and constructed to have a rocking movement thereon, the casting having a back flange extending longitudinally thereof for substantially its entire length and connecting with upwardly and outwardly inclined ends connecting with the base, a plate interposed between the said casting and axle, an inclined brace bar connected at its upper end to the platform and having an offset flange at its lower end engaging the under surface of the axle, a pivot bolt passing down through the casting, the plate, and axle and said offset portion of the brace bar, and upwardly diverging angle members secured at their lower ends to the casting in the angles formed by the back flange and ends of said casting and secured at their upper ends to the platform frame.

In testimony whereof I have signed my name to this specification in the presence of two subscribing witnesses.

JAMES PORTEOUS.

Witnesses:
H. O. DAVIS,
IRENE WILSON.

Copies of this patent may be obtained for five cents each, by addressing the "Commissioner of Patents, Washington, D. C."